United States Patent
Suchao-in et al.

(10) Patent No.: US 10,604,643 B2
(45) Date of Patent: Mar. 31, 2020

(54) ETHYLENE COPOLYMER COMPOSITION

(71) Applicants: SCG Chemicals Co., Ltd., Bangkok (TH); Mitsui Chemicals, Inc., Tokyo (JP)

(72) Inventors: Natthaporn Suchao-in, Bangkok (TH); Kenji Iwamasa, Chiba (JP); Eiji Shiba, Chiba (JP); Warachad Klomkamol, Bangkok (TH); Patcharin Samphawamontri, Bangkok (TH); Watcharee Cheevasrirungruang, Bangkok (TH); Shinichi Kojoh, Chiba (JP); Yasunori Kaneko, Chiba (JP); Takashi Fukawa, Chiba (JP); Thipphaya Pathaweeisariyakul, Bangkok (TH)

(73) Assignees: SCG Chemicals Co., Ltd., Bangkok (TH); Mitsui Chemicals, Inc., Tokyo (JP)

(*) Notice: Subject to any disclaimer, the term of this patent is extended or adjusted under 35 U.S.C. 154(b) by 43 days.

(21) Appl. No.: 15/780,645

(22) PCT Filed: Nov. 15, 2016

(86) PCT No.: PCT/EP2016/077656
§ 371 (c)(1),
(2) Date: Jun. 1, 2018

(87) PCT Pub. No.: WO2017/093008
PCT Pub. Date: Jun. 8, 2017

(65) Prior Publication Data
US 2019/0248991 A1  Aug. 15, 2019

(30) Foreign Application Priority Data

Dec. 3, 2015 (EP) .................................. 15197727

(51) Int. Cl.
| | | |
|---|---|---|
| C08L 23/06 | (2006.01) | |
| C08L 23/08 | (2006.01) | |
| C08F 210/16 | (2006.01) | |
| F16L 9/12 | (2006.01) | |
| C08F 2/00 | (2006.01) | |

(52) U.S. Cl.
CPC ........ *C08L 23/0815* (2013.01); *C08F 210/16* (2013.01); *C08L 23/06* (2013.01); *C08F 2/001* (2013.01); *C08F 2500/01* (2013.01); *C08F 2500/04* (2013.01); *C08F 2500/07* (2013.01); *C08F 2500/09* (2013.01); *C08F 2500/12* (2013.01); *C08F 2500/17* (2013.01); *C08F 2800/20* (2013.01); *C08L 2203/18* (2013.01); *C08L 2205/025* (2013.01); *C08L 2207/062* (2013.01); *C08L 2207/07* (2013.01); *C08L 2308/00* (2013.01); *C08L 2314/02* (2013.01); *F16L 9/12* (2013.01)

(58) Field of Classification Search
CPC .. C08F 210/16; C08F 2/0001; C08F 2500/01; C08F 2500/04; C08F 2500/07; C08F 2500/17; C08F 2800/20; C08L 23/06; C08L 23/0815; C08L 2205/025; C08L 2207/062; C08L 2207/07; C08L 2308/00; C08L 2314/02; F16L 9/12
See application file for complete search history.

(56) References Cited

U.S. PATENT DOCUMENTS

| | | |
|---|---|---|
| 2010/0035008 A1 | 2/2010 | Backman |
| 2010/0317798 A1* | 12/2010 | VanDun et al. .... C08L 23/0815 525/52 |
| 2013/0060736 A1 | 3/2013 | Casado et al. |
| 2014/0243475 A1 | 8/2014 | Mavridis et al. |
| 2017/0152376 A1* | 6/2017 | Liu et al. ................ C08L 23/06 |

FOREIGN PATENT DOCUMENTS

| | | |
|---|---|---|
| EP | 1584852 A1 | 10/2005 |
| EP | 1985660 A1 | 10/2008 |
| EP | 2894195 A1 | 7/2015 |
| WO | 2010/063445 A1 | 6/2010 |
| WO | 201310176 A2 | 1/2013 |

OTHER PUBLICATIONS

Jan. 18, 2017—PCT/EP2016/077656 ISR and WO.

* cited by examiner

*Primary Examiner* — Nathan M Nutter
(74) *Attorney, Agent, or Firm* — Banner & Witcoff, Ltd.

(57) ABSTRACT

The pipe articles with excellent stress crack resistance can be achieved by providing ethylene copolymer composition comprises ethylene and a C6-C10 α-olefin comonomer; the ethylene copolymer having a total density of 0.945-0.980 g/cm$^3$ and a MFR$_5$ of 0.10-0.50 g/10 min; and the ethylene copolymer having a comonomer content of 1-5% wt. The ethylene copolymer has $M_x/M_y$ in the range of not less than 14.0; gpcBR in the range of from 0.20 to 0.80; and strain hardening modulus <Gp> in the range of not less than 53.4.

15 Claims, No Drawings

ETHYLENE COPOLYMER COMPOSITION

CROSS-REFERENCE TO RELATED APPLICATIONS

This application is a U.S. National Stage application under 35 U.S.C. § 371 of International Application PCT/EP2016/077656 (published as WO 2017/093008 A1), filed Nov. 15, 2016 which claims the benefit of priority to Application EP 15197727.9, filed Dec. 3, 2015. Benefit of the filing date of each of these prior applications is hereby claimed. Each of these prior applications is hereby incorporated by reference in its entirety.

The present invention relates to an ethylene copolymer composition and an article comprising said composition.

The present invention is related to polymer composition comprising a multimodal composition of homo- and co-polyethylene fractions. It also concerns the process making the resin, and properties of pipe articles thereof.

It is generally known that polyethylene (PE) pipe articles can be manufactured by extrusion and for minor extent by injection molding. PE pipe is widely used for drinking water, gas, mining, fluids transport, in which the fluids can be pressurized or non-pressurized, and other types of pipes. PE100 materials, a polyethylene with a Minimum Required Strength (MRS) of 10 MPa, are widely accepted for a unique combination of having high pressure rating, outstanding resistance to Slow Crack Growth (SCG) along with outstanding resistance to Rapid Crack Propagation (RCP).

Moreover it's desired for a large pipe or thick pipe to have a good resistance to sagging. So that the resin is formed and solidified into pipe, the wall thickness does not deform and cause the problem during pipe welding.

Advanced pipe material should also increase the requirements of MRS not even conform to PE100. The higher pressure rating for examples PE112 and PE125, which are polyethylenes with a Minimum Required Strength (MRS) of 11.2 and 12.5 MPa, respectively are recently developed to achieve higher pressure resistance with challenging to the possible next designation of PE pipe standard.

In another type a new PE pipe designation called PE100RC (which stands for "resistant to crack") has been introduced to the industry. A resin that has received the PE100RC designation is typically used in economically attractive installation techniques, such as sandbed-less laying in open trenches, or in burst lining, where an old, defective pipe is forcibly widened and a new HDPE pipe liner is inserted during a single operation. With modern pipe-laying methods the pipe surface can be exposed to high point loads which accelerate cracking. According to the Publicly Available Specification, PAS1075, pipes made from PE100RC grades must withstand the high stress loads, which can be caused by scratches and point loads.

WO201310176 A2 disclosed a suitable polyethylene composition for use in pressure pipes and pipe fitting. An environment stress crack resistance as measured by Notched pipe test according to ISO13479 (9.2 bar, 80° C.) of greater than 1000 hours.

US2010/0035008 A1 disclosed a bimodal polyethylene composition with excellent slow crack growth properties measured by Notched Pressure Test according to ISO13479 (9.2 bar, 80° C.) at least 5000 hours and PENT test according to ASTM F1473 (at constant load 2.8 MPa, 80° C.) more than 5000 hours.

US201360736 A1 disclosed the process for blending of multimodal HDPE with UHMWPE. The blends performed good properties on notched impact strength and resist to sagging however the twice extrusion is required to minimize white spot and improve homogeneity.

It is therefore the object of the present invention to provide ethylene copolymer compositions overcoming drawbacks of the prior art, in particular featuring improved stress crack resistance in comparison with the prior art.

This object has been achieved by an ethylene copolymer composition comprising an ethylene copolymer comprising an ethylene monomer and a C6-C10 α-olefin comonomer; the ethylene copolymer having a total density of 0.945-0.980 g/cm$^3$ and a melt flow rate under 5 kg load (MFR$_5$) of 0.10-0.50 g/10 min; the ethylene copolymer having a C6-C10 alpha-olefin comonomer content of 1-5% wt; wherein the a $M_x/M_y$ is not less than 14.0 (wherein $M_x/M_y$ is the molecular weight distribution obtained from gel permeation chromatography) and a strain hardening modulus <Gp> of the ethylene copolymer is not less than 53.4.

Preferably, the ethylene copolymer composition consists of the ethylene copolymer. In the same way, it is preferred that the ethylene copolymer consists of the ethylene monomer and the $C_6$-$C_{10}$ alpha-olefin comonomer.

C6 in this regard means a monomer unit having a total number of 6 carbon atoms. In the same way, C10 does mean a monomer unit having 10 carbon atoms.

It is preferred that the $M_x/M_y$ is from 14.0 to 21 and more preferably from 16.0 to 21.

It is further preferred that the strain hardening modulus <Gp> of the ethylene copolymer is from 53.4 to 72.5, and more preferably form from 58.9 to 72.5. According to the invention a gpcBR index of the ethylene copolymer is from 0.20 to 0.80 with $$gpcBR = \left[\left(\frac{KM_{V,CC}^{\alpha}}{[\eta]}\right)\cdot\left(\frac{M_W}{M_{W,CC}}\right)^{\alpha} - 1\right] = \left[\left(\frac{[\eta]_{CC}}{[\eta]}\right)\cdot\left(\frac{M_W}{M_{W,CC}}\right)^{\alpha} - 1\right]$$

Where $M_{W,CC}$, $M_{V,CC}$ and $[\eta]_{CC}$ are the weight average molecular weight, viscosity average molecular weight, and intrinsic viscosity from conventional gel permeation chromatography (GPC) calculation, respectively, assuming polymer is linear with no Long Chain Branch (LCB). The $[\eta]$ term is the actual intrinsic viscosity, which is the measured value from the online viscometer, calculated by the viscometer peak area method for high precision. Mw is the weight average of absolute molecular weight from LS detector, also calculated by the LS peak area method for high precision. The values of Mark-Houwink parameters, α and K, are 0.725 and 0.0004416, respectively, for polyethylene in 1,2,4-trichlorobenzene (TCB) at 160° C. It is preferred that the gpcBR index of the ethylene copolymer is from 0.20 to 0.60, most preferably from 0.20 to 0.50.

Most preferred, the $M_x/M_y$ of ethylene copolymer is not less than 14.0, preferably from 14.0 to 21, and more preferably from 16.0 to 21; the gpcBR of ethylene copolymer is from 0.20 to 0.80, preferably from 0.20 to 0.60, more preferably from 0.20 to 0.50 and <Gp> is not less than 53.4, preferably 58.9 to 72.5.

Also preferred, the polymer ethylene copolymer is a bimodal ethylene copolymer and comprising a low average molecular weight ethylene homopolymer fraction and a high average molecular weight ethylene copolymer fraction.

It is further preferred that the α-olefin comonomer is selected from 1-hexene, 1-octene, or 1-decene or mixtures thereof more preferably 1-hexene.

Preferably, the weight ratio between the low average molecular weight fraction and the high average molecular weight fraction is in the range from 35:65 to 65:35.

A further object of the invention is achieved by an article comprising the inventive polymer composition.

Preferably, the article is a pressured or non-pressured pipe.

Surprisingly, it has been found that the inventive ethylene copolymer composition as well as articles comprising said compositions, such as pipes, overcome the drawbacks of the prior art by featuring excellent stress crack resistance.

In particular, it is the finding of present invention that by selecting a particular polymer design it is possible to obtain resins having excellent stress crack resistance with other properties conform to PE100RC. The molar mass parameters from gel permeation chromatography GPC ($M_x$ and $M_y$) is applied to determine the composition representing the range of molecular weight, containing high tie molecule as a good results of comonomer distribution and low long chain branch in multimodal resin. The good balance of both portions promotes the improvement of stress crack resistance determining by strain hardening modulus <Gp>. $M_x$ is applied to relate with some polymer properties in an article by Yau, W. W. (Yau, W. W., Wang, J., Cong, R., Gillespie, D., and Huang, J., Proceedings of SPE ANTEC@NPE2009, Jun. 22-24, 2009, Chicago, Ill., USA.)

The invention further relates to a process making a resin from the inventive composition and the use of the inventive article being pipe and fitting for drinking water, gas, mining, fluids transport, in which the fluids can be pressurized or non-pressurized, and other types of pipes. Pipe articles can be single- or multi-layers.

The inventive pipe articles with excellent stress crack resistance can be achieved by providing a polymer composition comprising a multimodal polyethylene with $MFR_5$ 0.10-0.50 g/10 min, preferably 0.10-0.30 g/10 min. The density of composition is 0.945-0.980 g/cm$^3$, preferably 0.950-0.962 g/cm$^3$. The stress cracking resistance is determined by strain hardening modulus <Gp>. The polydispersity index is defined by $M_x/M_y$ while x=2 and y=−0.1.

This ratio of molecular mass in GPC ($M_x$ and $M_y$) is related to the range of molecular weight, which contains high tie molecule amount and low long chain branch. The good comonomer distribution on high Mw part of polyethylene promotes higher amount of tie molecule which enhance the stress crack resistance. Larger amount of long chain branch normally decrease the tie molecule compared with the same polymer density and also effect to the viscosity and flow ability of resin. Then the highest molecular mass portion containing long chain branch sometimes may not improve stress crack resistance.

In a preferred embodiment, the inventive ethylene copolymer composition is provided, wherein the bimodal ethylene copolymer comprises 52 to 60% wt of the low average molecular weight ethylene homopolymer fraction and 40 to 48% wt of the high average molecular weight ethylene copolymer fraction and preferably the low average molecular weight ethylene homopolymer fraction has an $MFR_2$ in a range of 300 to 600 g/10 min and a density >0.970 g/cm$^3$ and the high average molecular weight ethylene copolymer fraction has an $MFR_5$ in the range of 0.20-0.25 g/10 min and density within a range of 0.952-0.955 g/cm$^3$.

The pipe articles according to the present invention preferable shows a strain hardening modulus <Gp> of not less than 53.4, more preferably from 58.9 to 72.5.

The manufacture of the polyethylene composition according to the invention is carried out in slurry with a unipolar solvent, preferably hexane diluent through multi-stage polymerization in cascade reactors connecting in series, preferably CX process. A process comprising the steps of:

A) A first polymerization step to obtain polyethylene homo- or co-polymer fraction with alpha-olefins comonomer. The polymer is low average molecular weight (LMW) fraction.

B) Polymerization of high average molecular weight (HMW) fractions is carried out continuously in the second and/or third reactor to produce copolymer fraction with alpha-olefins comonomer which higher average molecular weight and comonomer content than fraction A.

Preferably the polymerization is carried out in two stages that have low average molecular weight homo-polymer in the first stage and high average molecular weight co-polymer in the second stage. The split ratio of LMW:HMW fraction should be in the range of 65:35 to 35:65, more preferable from 65:35 to 55:45. Preferably LMW homopolymer has $MFR_2$ in the range of 100 to 800 g/10 min, more preferably from 300 to 600 g/10 min and density ≥0.970 g/cm$^3$.

The comonomer is alpha-olefins from C6-C12, preferably 1-hexene, 1-octene and 1-decene, most preferably 1-hexene.

The amount of comonomer is preferably in the range of 1-5% wt, more preferably in the range of 1.5-2.5% wt.

The polymerization catalysts for the production of polyethylene composition according to this invention may include coordination catalysts of a transition metal, i.e. Ziegler-Natta (ZN) or metallocenes. The catalyst may be supported with conventional support material including magnesium or silica. Preferably the catalyst is a ZN catalyst, most preferably a MgCl$_2$-based ZN catalyst.

The polyethylene is further compounded with carbon black loading of 2-3% wt to meet the PE100 material requirements. Carbon black powder or masterbatch can be incorporated into the compound.

In certain embodiment of invention, strain hardening modulus <Gp> measured at 80° C. is 63 MPa. Accelerated creep test (ACT) tested by Hessel, Germany is 1466 hours which accordance with correlation of Full Notched Creep Test (FNCT) for more than 8760 hours. The obtainable invention meets the designation of PE100RC. All the results indicated the distinguish features and advantages of the inventive ethylene copolymer compositions over the prior art.

Definitions and Measurement Methods a) Density

Density is measured according to ISO 1183 and showed in g/cm$^3$ unit.

b) Melt Flow Rate

The melt flow rate (MFR) is determined according to ISO1133 at 190° C. and is indicated in g/10 min. The load under the melt flow rate is determined and indicated as a subscript, for instance $MFR_2$ is measured under 2.16 kg load, $MFR_5$ is measured under 5 kg load.

c) Strain Hardening Modulus <Gp>

Strain hardening modulus can be determined according to Polymer 46 (2005) page 6369-6379. In brief, pressed sheet was prepared from compounded pellet at 160° C. with a thickness of about 300 μm. After pressing, the samples are annealed for 1 h at 120° C. The test specimens are punched from the press sheets following the ISO37 type 3. The measurement is in principle a standard tensile test with 200N load cell. Prior to the testing, the specimen are kept about 30 min to allow thermal equilibrium. The test specimen is extended at constant speed 10 mm/min until the true strain reaches 12.

The strain hardening modulus <Gp> is calculated as the average difference quotient:
The average runs over all N difference quotients:

$$<G_p> = \frac{1}{N}\sum_{i=1}^{N} \frac{\sigma_{i+1} - \sigma_i}{\lambda_{i+1} - \lambda_i}$$

The calculation of <Gp> is performed typically between draw ratio 8 and 12 and expressed in unit MPa.

d) $M_x/M_y$

Molecular weight distribution (MWD) obtained from gel permeation chromatography with 3 detectors (3D-GPC); where the detectors are IR5, viscometer and multi-angle light scattering. The sample was cut into small pieces, and weighed around 16 mg in 10-ml vial, then transferred to GPC system, and 8 ml of 1,2,4-trichlorobenzene was added into the vial with automatic Nitrogen purging. The sample was dissolved under 160° C. for 90 min. Then the sample solution, 200 µl was injected into the GPC system with flow rate of 0.5 ml/min at 145° C. in column zone and 160° C. in all 3 detectors.

MWD data, $w_i$ and $M_i$ from IR5 or concentration detector, $M_x$ can be calculated from the following equation (Yau, W. W., Wang, J., Cong, R., Gillespie, D., and Huang, J., Proceedings of SPE ANTEC@NPE2009, Jun. 22-24, 2009, Chicago, Ill., USA).

$$M_x = \left[\frac{\Sigma w_i \times M_i^x}{\Sigma w_i}\right]^{\frac{1}{x}}$$

$M_x$ and $M_y$ is defined as x equal to 2 and -0.1, respectively, which provide best fit to Strain hardening modulus <Gp>. Then the polydispersity index $M_x/M_y$ can be calculated.

e) gpcBR

The gpcBR index provides a measure of polymer branching level with a high precision, by combining intrinsic viscosity and absolute MW measurements from viscometer and Light Scattering (LS) detectors. The expression of gpcBR is:

$$gpcBR == \left[\left(\frac{KM_{V,CC}^\alpha}{[\eta]}\right)\cdot\left(\frac{M_W}{M_{W,CC}}\right)^\alpha - 1\right] = \left[\left(\frac{[\eta]_{CC}}{[\eta]}\right)\cdot\left(\frac{M_W}{M_{W,CC}}\right)^\alpha - 1\right]$$

Where $M_{W,CC}$, $M_{V,CC}$ and $[\eta]_{CC}$ are the weight average molecular weight, viscosity average molecular weight, and intrinsic viscosity from conventional gel permeation chromatography (GPC) calculation, respectively, assuming polymer is linear with no Long Chain Branch (LCB). The $[\eta]$ term is the actual intrinsic viscosity, which is the measured value from the online viscometer, calculated by the viscometer peak area method for high precision. Mw is the weight average of absolute molecular weight from LS detector, also calculated by the LS peak area method for high precision. The values of Mark-Houwink parameters, α and K, are 0.725 and 0.0004416, respectively, for polyethylene in 1,2,4-trichlorobenzene (TCB) at 160° C. The interpretation of gpcBR is simple and straight forward. For linear polymers, gpcBR will be close to zero. For branched polymers, gpcBR will be higher than zero. In fact, gpcBR value represents the fractional [η] change due to the molecular size contraction effect as the result of polymer branching.

f) Accelerated Creep Test (ACT)

The test is performed by HESSEL Ingenieurtechnik GmbH following the PAS1075 standard and expressed the result time in hour (h).

g) Charpy Impact Strength

Charpy impact strength is determined according to ISO179 at 23° C. and -30° C. and showed in the unit kJ/m².

EXAMPLES

In order to produce an inventive bimodal PE resin, the polymerization process and procedure is typically the same as that of CX slurry process. Also, Ziegler-Natta catalyst is used. The comonomer type was applied by 1-hexene. However, the operating conditions have to optimize with polymer design.

The polymerization catalysts include coordination catalysts of a transition metal called Ziegler-Natta (ZN). The catalyst preparation was described in European patent number 744415 by Mitsui Chemicals Inc. Bimodal polyethylene resins, hereinafter base resin, produced in accordance with two-stage cascade slurry polymerization process and having composition ratios of a) low molecular weight (LMW) HDPE having MFR₂ in the range of 300 to 600 g/10 min, and density ≥0.970 g/cm³ and b) high molecular weight (HMW) HDPE having MFR₅ 0.20-0.25 g/10 min and density 0.952-0.955 g/cm³. The LMW HDPE resin is a homopolymer polymerized in the first reactor in the absence of comonomer. The HMW PE resin produced in the second reactor is copolymer containing 1-hexene content (or 1-butene for comparative case II and III) of 1.5-2.5% wt. The 1-butene comonomer is used for comparative II and III. The bimodal resin comprises 52 to 60% wt. of the first polyethylene homopolymer fraction and 40 to 48% wt. of a second polyethylene copolymer fraction.

The obtaining bimodal PE product from the second reactor was dried and the resulting powder sent to a finishing operation where it was compounded with carbon black 2-2.5 wt % in extruder at 260° C. under nitrogen atmosphere with 2000 ppm Ca/Zn stearate and 3000 ppm hindered phenol/phosphate stabilizers and, then, pelletized. Density and MFR were obtained using the pelletized resins.

Plastic pipe is produced by extruding molten polymer through an annular die. The pipe is formed by passing the molten extrudate through a sizing sleeve and then to a cooling tank where water is sprayed on the outer surface. Solidification proceeds from the outer surface radially inward.

Polymerization conditions and polymer properties are shown in Table 1-2, respectively. Testing results and analysis were applied and recorded on the compound.

TABLE 1

Polymerization conditions of Example 1, Example 2 and Comparative example.

|  |  | Example 1 | Example 2 | Comparative III |
|---|---|---|---|---|
| Homopolymer |  |  |  |  |
| Temperature | (° C.) | 81-85 | 81-85 | 81-85 |
| Pressure | Bar | 7.5-8.0 | 7.5-8.0 | 7.0-7.5 |
| Hexane flow | L/h | 44.8 | 44.8 | 32.5 |

TABLE 1-continued

Polymerization conditions of Example 1, Example 2 and Comparative example.

| | | Example 1 | Example 2 | Comparative III |
|---|---|---|---|---|
| rate | | | | |
| Ethylene flow rate | L/h | 1244 | 1258 | 1436 |
| Hydrogen flow rate | NL/h | 443 | 446 | 193 |
| Catalyst flow rate | g/h | 3.03 | 2.79 | 1.79 |
| Production rate Copolymer | kg/h | 22 | 22 | 25 |
| Temperature | (° C.) | 68-70 | 68-70 | 70-75 |
| Pressure | Bar | 2.0-3.0 | 2.0-3.0 | 2.5-3.0 |
| Hexane flow rate | L/h | 88 | 88 | 714 |
| Ethylene flow rate | L/h | 2804 | 2804 | 2640 |
| Hydrogen flow rate | NL/h | 1.77 | 0 | 2 |
| Co-monomer | kg/h | 1.15 | 1.43 | 0.54 |
| Comonomer/Ethylene Feed | — | 0.116 | 0.144 | 0.045 |
| Production rate | kg/h | 22 | 22 | 25 |
| Pressure | bar | 2.1 | 2.1 | 3.0 |
| Comonomer | | 1-Hexene | 1-Hexene | 1-Butene |

TABLE 2

Polymer properties of Example 1, Example 2 and Comparative examples.

| | | Example 1 | Example 2 | Comparative I | Comparative II | Comparative III |
|---|---|---|---|---|---|---|
| Density | g/cm³ | 0.960 | 0.961 | 0.959 | 0.958 | 0.959 |
| MFR$_5$ | g/10 min | 0.21 | 0.18 | 0.25 | 0.22 | 0.23 |
| 1-Hexene Content | % wt | 2.11 | 1.88 | 1.75 | 1.56 | — |
| 1-Butene Content | % wt | — | — | — | — | 2.16 |
| <Gp> | MPa | 64.4 | 63.0 | 57.1 | 53.3 | 45.9 |
| M$_x$ | g/mol | 651,624 | 650,823 | 693,161 | 626,074 | 577,229 |
| M$_y$ | g/mol | 40,726 | 37,413 | 43,640 | 45,081 | 42,521 |
| M$_x$/M$_y$ | | 16.0 | 17.4 | 15.9 | 13.9 | 13.6 |
| gpcBR | | 0.418 | 0.445 | 0.186 | 0.020 | 0.489 |
| ACT | h | 1436 | 1466 | 1309 | 439 | — |
| Charpy (23° C.) | kJ/m² | 34.8 | 34.3 | 37.2 | 31.5 | 23.2 |
| Charpy (−30° C.) | kJ/m² | 17.2 | 12.8 | 9.5 | 15.6 | 6.7 |

TABLE 3

Comparison of inventive Examples 1 and 2 and the prior art

| Property | Prior arts (EP1985660A1) | Example 1 | Example 2 |
|---|---|---|---|
| Charpy (23° C.), kJ/m² | — | 34.8 | 34.3 |
| Charpy (0° C.), kJ/m² | 21.3 | 27.9 | 25.6 |
| Charpy (−30° C.) kJ/m² | — | 17.2 | 12.8 |
| Density natural pellet, g/cm³ | 0.947 | 0.9519 | 0.9511 |
| ACT, h | 1603 | 1436 | 1466 |

As it is shown in Table 3, inventive Examples 1 and 2 have significantly improved charpy impact in comparison with the prior art. To allow the comparison with the prior art, the Experiments shown above with respect to charpy impact have been reproduced for inventive Examples 1 and 2 at 0° C. As it is evident from Table 3, significantly improved charpy impact results (27.9 and 25.6 instead of 21.3) have been achieved using the inventive compositions.

Furthermore, superior slow crack growth, represented by ACT measurement, was observed. When comparing the ACT values of the prior with present invention, it has to be kept in mind that the inventive Examples have a higher density due to the lower amount of comonomer. Since it is well-known that ACT results linearly depend from the comonomer content, the above values indeed suitable to show superiority of the present invention over the prior art.

The invention claimed is:
1. Ethylene copolymer composition comprising an ethylene copolymer comprising an ethylene monomer and a C6-C10 α-olefin comonomer;
the ethylene copolymer having a total density of 0.945-0.980 g/cm³ and
a melt flow rate under 5 kg load (MFR$_5$) of 0.10-0.50 g/10 min;
the ethylene copolymer having a C6-C10 α-olefin comonomer content of 1-5% wt;
wherein a M$_x$/M$_y$ is not less than 14.0 (wherein M$_x$/M$_y$ is the molecular weight distribution obtained from gel permeation chromatography) and
a strain hardening modulus <Gp> of the ethylene copolymer is not less than 53.4
wherein a gpcBR index of the ethylene copolymer is from 0.20 to 0.80 with

$$gpcBR = \left[\left(\frac{KM_{V,CC}^\alpha}{[\eta]}\right) \cdot \left(\frac{M_W}{M_{W,CC}}\right)^\alpha - 1\right] = \left[\left(\frac{[\eta]_{CC}}{[\eta]}\right) \cdot \left(\frac{M_W}{M_{W,CC}}\right)^\alpha - 1\right]$$

Where $M_{W,CC}$, $M_{V,CC}$ and $[\eta]_{CC}$ are the weight average molecular weight, viscosity average molecular weight, and intrinsic viscosity from conventional gel permeation chromatography (GPC) calculation, respectively, based on the polymer being linear with no Long Chain Branch (LCB), the [η] term is the actual intrinsic viscosity, which is the measured value from the online viscometer, calculated by the viscometer peak area method for high precision; Mw is the weight average of absolute molecular weight from LS detector, also calculated by the LS peak area method for high precision;

and the values of Mark-Houwink parameters, α and K, are 0.725 and 0.0004416, respectively, for polyethylene in 1,2,4-trichlorobenzene (TCB) at 160° C.

2. Ethylene copolymer composition according to claim 1, wherein the $M_x/M_y$ is from 14.0 to 21.

3. Ethylene copolymer composition according to claim 1, wherein the strain hardening modulus <Gp> of the ethylene copolymer is from 53.4 to 72.5.

4. Ethylene copolymer composition according to claim 1, wherein the gpcBR index of the ethylene copolymer is from 0.20 to 0.80.

5. Ethylene copolymer composition according to claim 1, wherein the ethylene copolymer is a bimodal ethylene copolymer comprising a low average molecular weight ethylene homopolymer fraction and a high average molecular weight ethylene copolymer fraction.

6. Ethylene copolymer composition according to claim 1, wherein the α-olefin comonomer is selected from the group consisting of 1-hexene, 1-octene, 1-decene, and mixtures thereof.

7. Ethylene copolymer composition according to claim 6, wherein the weight ratio between the low average molecular weight fraction and the high average molecular weight fraction is in the range from 35:65 to 65:35.

8. Ethylene copolymer composition according to claim 5, wherein the bimodal ethylene copolymer comprises 52 to 60% wt of the low average molecular weight ethylene homopolymer fraction and 40 to 48% wt of the high average molecular weight ethylene copolymer fraction.

9. An article comprising a polymer composition according to claim 1.

10. An article according to claim 9 wherein the article is a pressured or non-pressured pipe.

11. The ethylene copolymer composition of claim 2, wherein the $M_x/M_y$ is from 16.0 to 21.

12. The ethylene copolymer composition of claim 3, wherein the strain hardening modulus <Gp> is from 58.9 to 72.5.

13. The ethylene copolymer composition according to claim 4, wherein the gpcBR index of the ethylene copolymer is from 0.20 to 0.60.

14. The ethylene copolymer composition according to claim 13, wherein the gpcBR index of the ethylene copolymer is from 0.20 to 0.50.

15. The ethylene copolymer composition of claim 8, wherein the low average molecular weight ethylene homopolymer fraction has an $MFR_2$ from 300 to 600 g/10 min and a density >0.970 g/cm³, and the high average molecular weight ethylene copolymer fraction has an $MFR_5$ from 0.20 to 0.25 g/10 min and density from 0.952 to 0.955 g/cm³.

* * * * *